E. A. THOMAS.
CHILD'S SEAT FOR CARRIAGES AND VEHICLES.
APPLICATION FILED OCT. 17, 1907.

946,520.

Patented Jan. 11, 1910.

2 SHEETS—SHEET 1.

Witnesses
F. L. Ourand
M. K. Freeman

Inventor
Emmett A. Thomas
By Louis Bagger & Co.
his Attorneys

E. A. THOMAS.
CHILD'S SEAT FOR CARRIAGES AND VEHICLES.
APPLICATION FILED OCT. 17, 1907.
946,520.
Patented Jan. 11, 1910.
2 SHEETS—SHEET 2.
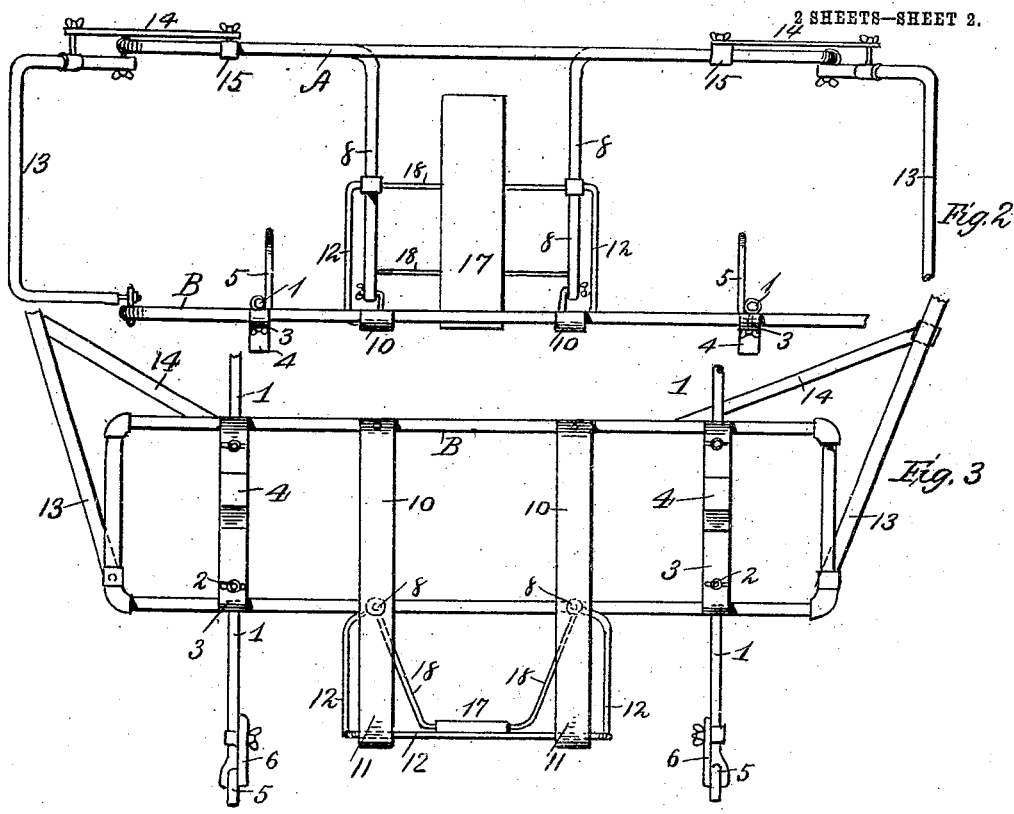
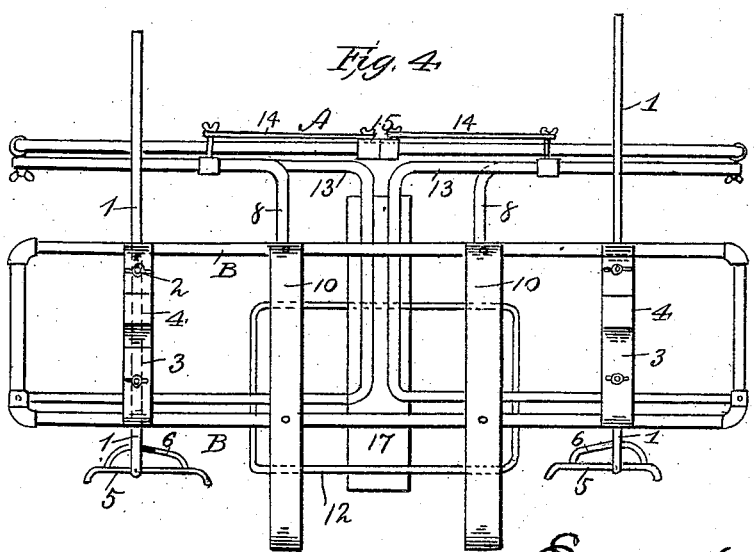
Witnesses
F. L. Ormand
M. K. Freeman
Inventor
Elmer A. Thomas
By Louis Bagger & Co.
his Attorneys

UNITED STATES PATENT OFFICE.

ELMER A. THOMAS, OF RED CLOUD, NEBRASKA.

CHILD'S SEAT FOR CARRIAGES AND VEHICLES.

946,520.

Specification of Letters Patent.   Patented Jan. 11, 1910.

Application filed October 17, 1907. Serial No. 397,838.

*To all whom it may concern:*

Be it known that I, ELMER A. THOMAS, a citizen of the United States, residing at Red Cloud, in the county of Webster and State of Nebraska, have invented certain new and useful Improvements in Children's Seats for Carriages and Vehicles, of which the following is a specification.

My invention relates to an improvement in child's seat for carriages and vehicles, which can be placed upon the floor of same and the object is to provide a seat which can be adjusted to conform to the floor of the carriage or vehicle in which it is placed, and to any inclination of the floor, and which can be folded in a small compass when not in use, allowing persons to get in and out of carriage or vehicle easily.

The invention relates to certain other novel features of construction and combinations of parts which will be hereinafter described and pointed out in the claims.

Figure 1:
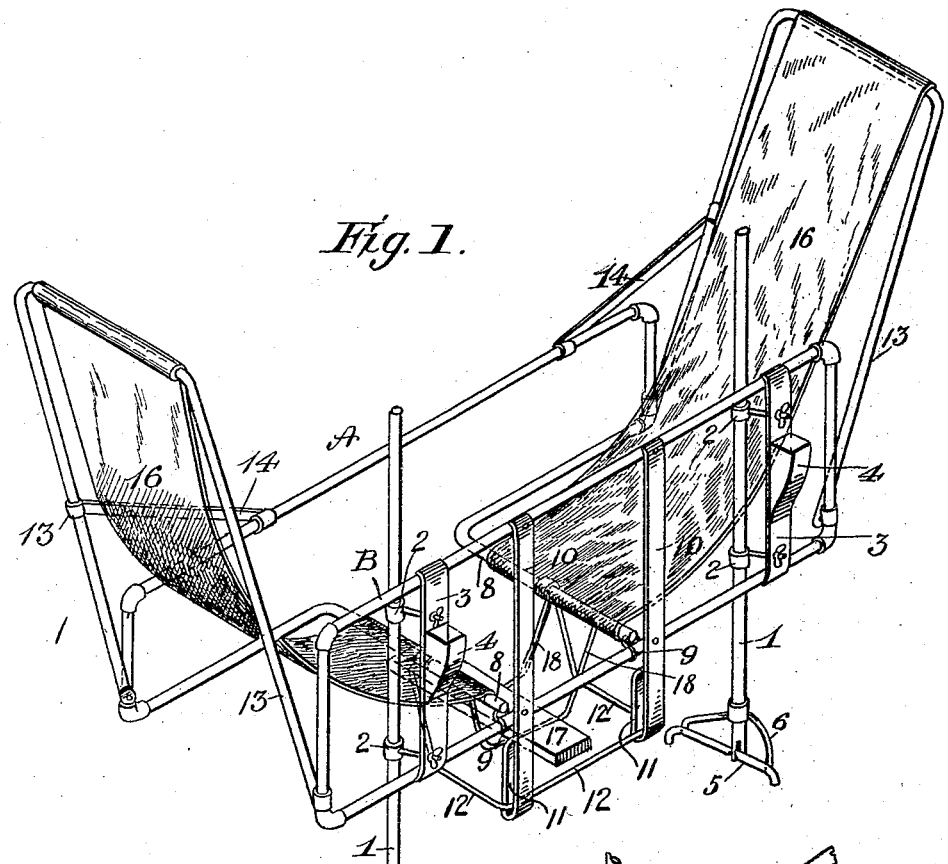
Figure 5:
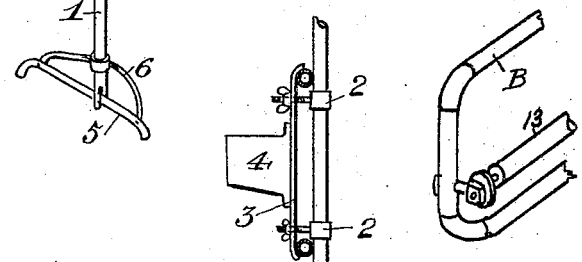
Figure 6:
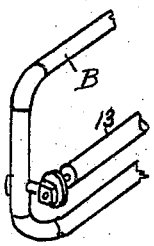

In the accompanying drawings:—Figure 1 is a view in perspective. Fig. 2 is a top plan view. Fig. 3 is a side view. Fig. 4 is a view showing the parts folded together. Fig. 5 is an end view of one of the standards showing the manner of connecting the frame thereto. Fig. 6 is a detail showing the pivotal connection between the back and the frame.

A and B represent the sides of the frame, and to the frame B, standards 1, 1, are connected by couplings 2, 2, to which are connected plates 3 having cushioning means preferably of rubber 4 thereon, which bears against the dash board of a wagon or body of the carriage to prevent marring. The bases of these standards are pivotally connected to foot bars 5. These foot bars have a slotted arm 6 thereon to which the standard 1 is secured by means of a coupling to hold it in rigid position or to permit the standard being adjusted along the arm 6 whereby the seat may be brought to the desired position in a horizontal direction. The standard 1 and plates 3 being connected by the couplings 2 are capable of adjustment along the frame whereby the standards are adapted to support the seat in any sized body of a carriage as it permits of the standards being brought within the sides of the body of the vehicle and resting on the floor thereof.

The seat is connected at or about its center and at its lower edge by means of connecting bars 8, 8, to the lower edge of the side B by hinged coupling 9. Bars 10, 10, secured to the frame B and extending below the lower edge thereof are provided with elongated slots 11. A U-shaped brace 12 is received in the elongated slots 11 and is connected to the bars 8 of the frame A to afford supporting means for the bars 8.

At the lower ends of the sides A and B, backs 13, 13, are pivotally connected and to one side of each back, an arm 14 is in pivotal engagement, and at the opposite end of the arm a sleeve 15 is connected thereto, which sleeve is adjustably mounted on the frame A whereby the desired inclination can be given to the back. Canvas 16 or other material extends from the bars 8 to the upper ends of the back 13, forming a seat or support.

A foot rest 17 is pivotally held between and below the bars 8 by means of braces 18 which are connected to the bars 8.

When it is desired to fold the seat up in a small compass, the sleeves 15 are released so that they are capable of sliding along the frame A, thereby permitting the backs 13 to be folded inward and so that they rest upon bars 8 so that the standards 1 rest upon the frame A. Then the side B is folded over upon the backs 13 through pivotal connection between the side B and the backs and the pivotal connection between the bars 8 and the side B. The U-shaped brace would slide upwardly and rearwardly in the elongated slots permitting of the side B to fold and the standards connected with the side B will rest upon the frame A. The standards can be turned in the couplings so that the foot bars 5 will extend in the same plane with the other parts and the foot-rest 17 can be folded against the folded frame.

It is evident that more or less slight changes might be resorted to in the form and arrangement of the several parts described without departing from the spirit and scope of my invention, and hence I do not wish to limit myself to the exact construction herein set forth, but:—

Having fully described my invention, what I claim as new and desire to secure by Letters Patent, is:—

1. A seat comprising sides, connecting bars pivotally connecting the sides together, backs connected to the sides, bars on one of the sides having elongated slots therein, and means received in the slots and connected to the other side for supporting the base of the seat.

2. In a seat, the combination with sides, of bars pivotally connecting the sides together, backs pivotally connected to the sides, standards adjustably connected to the sides, foot bars on which the standards are supported, and an arm connected to the foot bars for holding the standards in their adjusted positions.

In testimony whereof I affix, my signature in presence of two witnesses.

ELMER A. THOMAS.

Witnesses:
C. H. Fort,
E. W. Hass.